(12) United States Patent
Koroly et al.

(10) Patent No.: US 12,110,844 B2
(45) Date of Patent: Oct. 8, 2024

(54) ZONED LINER EXHAUST WITH BURIED N-CORE

(71) Applicant: ROHR, INC., Chula Vista, CA (US)

(72) Inventors: Christopher C. Koroly, Spring Valley, CA (US); Jose S. Alonso-Miralles, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/987,671

(22) Filed: Nov. 15, 2022

(65) Prior Publication Data

US 2024/0159202 A1    May 16, 2024

(51) Int. Cl.
*F02K 1/82* (2006.01)

(52) U.S. Cl.
CPC ........ *F02K 1/827* (2013.01); *F05D 2220/323* (2013.01); *F05D 2260/96* (2013.01)

(58) Field of Classification Search
CPC ....................... F05D 2260/96; F05D 2220/323
See application file for complete search history.

(56) References Cited

U.S. PATENT DOCUMENTS

| 8,579,225 | B2 | 11/2013 | Mardjono et al. |
| 8,776,946 | B2 * | 7/2014 | Todorovic ............... F01D 25/30 60/770 |
| 9,783,316 | B2 | 10/2017 | Alonso-Miralles |
| 10,066,548 | B2 | 9/2018 | Gilson et al. |
| 11,323,718 | B2 * | 5/2022 | Martinelli ............ H04N 19/176 |
| 11,428,191 | B1 | 8/2022 | Alonso-Miralles et al. |
| 11,571,850 | B2 * | 2/2023 | John ..................... B29C 64/129 |

| 2007/0256889 | A1 | 11/2007 | Yu et al. |
| 2010/0012423 | A1 * | 1/2010 | Mercat .................... F02K 1/827 181/292 |
| 2020/0347785 | A1 * | 11/2020 | Morin ...................... F02C 7/24 |

FOREIGN PATENT DOCUMENTS

| EP | 4083409 | 11/2022 |
| WO | 2022129778 | 6/2022 |

OTHER PUBLICATIONS

Acoustic Liner for Turbomachinery Applications, John H. Glenn Research Center, Cleveland, Ohio, NASA Tech. Briefs, Sep. 2010.*
European Patent Office, European Search Report dated Mar. 27, 2024 in Application No. 23208894.8.

* cited by examiner

*Primary Examiner* — Todd E Manahan
*Assistant Examiner* — Rodolphe Andre Chabreyrie
(74) *Attorney, Agent, or Firm* — SNELL & WILMER L.L.P.

(57) ABSTRACT

A center plug for attenuating noise in a gas turbine engine includes an inner skin, a forward bulkhead, and aft bulkhead, and a noise attenuation panel. The inner skin has a substantially cylindrical shape and extending along an axial centerline. The forward bulkhead is disposed proximate a forward end of the inner skin. The forward bulkhead is connected to and extends radially outward from the inner skin. The aft bulkhead is disposed proximate an aft end of the inner skin. The aft bulkhead is connected to and extending radially outward from the inner skin. The noise attenuation panel is positioned intermediate the inner skin and partially divides a region bounded by the inner skin, the forward bulkhead and the aft bulkhead into.

18 Claims, 10 Drawing Sheets

ZONED LINER EXHAUST WITH BURIED N-CORE

FIELD

The present disclosure relates generally to an aircraft gas turbine engine exhaust system and, more particularly, to an exhaust nozzle and a centerbody that attenuate exhaust noise via a zoned system of acoustic attenuators disposed throughout the exhaust nozzle and the centerbody.

BACKGROUND

The engines of an aircraft propelled by gas turbine engines produce varying amounts of audible noise during takeoff and landing. For example, a gas turbine engine typically operates at or near maximum thrust as the aircraft departs from an airport and at a lower thrust as the aircraft approaches an airport. Some aircraft engine noise can be partially suppressed at the engine nacelle inlet and the exhaust nozzle and centerbody by noise absorbing structures. These structures can absorb acoustic energy by canceling reflected acoustic waves or by converting acoustic energy into heat. The structures typically consist of a porous skin and three or more non-perforated walls to form one or more chambers. The porous skin and the non-perforated walls of such chambers combine to form a plurality of Helmholtz resonators that resonate in response to certain sound frequencies or certain bands of frequencies and cancel sound waves reflected between the porous face skin and non-perforated walls or subsequently convert the sound energy into heat (via elastic or mechanical hysteresis caused by the resonant response of air within the resonator cavities and of the liner components), and thereby effectively absorb or dissipate at least a portion of generated engine noise.

Speaking generally, relatively thin acoustic panels may be utilized to attenuate noise with relatively short wavelengths and high frequencies, whereas relatively thick acoustic panels may be utilized to attenuate noise with relatively long wavelengths and low frequencies. However, as noise wavelengths become longer as a byproduct of engine design changes while space allocation for noise attenuation structures decreases, traditional acoustic panel configurations may not attenuate noise to acceptable levels, which are often mandated by government regulations. To achieve further reductions in the noise levels of gas turbine engines used on modern aircraft, especially during aircraft takeoffs and approaches, it is desirable to dissipate some of the long-wavelength and low-frequency noise generated by the combustor and the exhaust system of a gas turbine engine, particularly where the combustor and exhaust noise has one or more frequencies less than about 1,000 Hz.

SUMMARY

A center plug for attenuating noise in a gas turbine engine is disclosed. In various embodiments, the center plug includes an inner skin, a forward bulkhead, and aft bulkhead, and a noise attenuation panel. The inner skin has a substantially cylindrical shape and extending along an axial centerline. The forward bulkhead is disposed proximate a forward end of the inner skin. The forward bulkhead is connected to and extends radially outward from the inner skin. The aft bulkhead is disposed proximate an aft end of the inner skin. The aft bulkhead is connected to and extending radially outward from the inner skin. The noise attenuation panel is positioned intermediate the inner skin and partially divides a region bounded by the inner skin, the forward bulkhead and the aft bulkhead.

In various embodiments, the center plug further includes an outer skin. The outer skin is connected to and positioned radially outward of the forward bulkhead and the aft bulkhead.

In various embodiments, the outer skin, the inner skin, the forward bulkhead and the aft bulkhead define an annular chamber.

In various embodiments, the noise attenuation panel extends between the forward bulkhead and the aft bulkhead.

In various embodiments, the noise attenuation panel extends between the outer skin and the inner skin.

In various embodiments, the outer skin includes an acoustically permeable portion in fluid communication with the annular chamber.

In various embodiments, the noise attenuation panel is configured to attenuate noise at a frequency of at least 1500 Hz.

A noise attenuation system for a gas turbine engine is disclosed. The noise attenuation system includes an exhaust nozzle and a center plug. The exhaust nozzle includes a first noise attenuation panel disposed on a radial inner side of the exhaust nozzle. The center plug includes an inner skin, a forward bulkhead, and aft bulkhead, and a second noise attenuation panel. The inner skin has a substantially cylindrical shape and extending along an axial centerline. The forward bulkhead is disposed proximate a forward end of the inner skin. The forward bulkhead is connected to and extends radially outward from the inner skin. The aft bulkhead is disposed proximate an aft end of the inner skin. The aft bulkhead is connected to and extending radially outward from the inner skin. The second noise attenuation panel is positioned intermediate the inner skin and partially divides a region bounded by the inner skin, the forward bulkhead and the aft bulkhead.

In various embodiments, the noise attenuation system includes an outer skin. The outer skin is connected to and positioned radially outward of the forward bulkhead and the aft bulkhead.

In various embodiments, the outer skin, the inner skin, the forward bulkhead and the aft bulkhead define an annular chamber.

In various embodiments, the second noise attenuation panel extends between the forward bulkhead and the aft bulkhead.

In various embodiments, the second noise attenuation panel extends between the outer skin and the inner skin.

In various embodiments, the first noise attenuation panel includes a single panel configured to extend circumferentially about the exhaust nozzle.

In various embodiments, the noise attenuation system includes a plurality of baffles spaced circumferentially about the inner skin and extending radially between the inner skin and the outer skin and axially between the forward bulkhead and the aft bulkhead.

In various embodiments, the plurality of baffles includes four baffles spaced at ninety-degree intervals such that the annular chamber is divided into four equally sized resonator cavities.

In various embodiments, the second noise attenuation panel is disposed on at least one of the plurality of baffles.

In various embodiments, the outer skin includes an acoustically permeable portion in fluid communication with the annular chamber.

In various embodiments, the acoustically permeable portion is formed by a plurality of openings extending through the outer skin such that the acoustically permeable portion coincides with the resonator cavities.

In various embodiments, the first noise attenuation panel and the second noise attenuation panel are configured to attenuate noise at a frequency of at least 1500 Hz.

In various embodiments, the noise attenuation system includes an outer layer integral with the second noise attenuation panel. The outer layer is a perforated sheet of the second noise attenuation panel.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
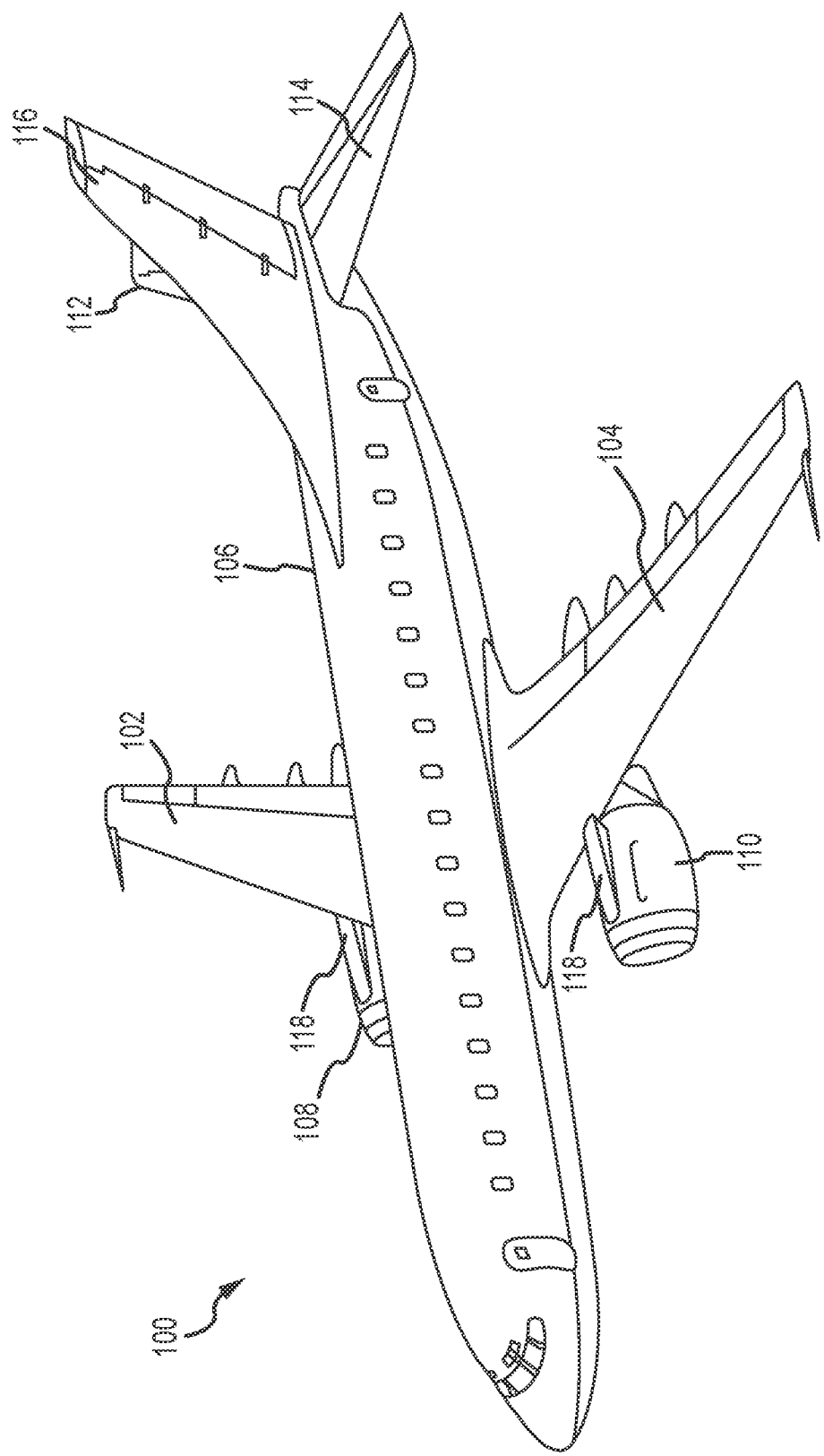
FIG. 1A is a perspective illustration of an aircraft, in accordance with various embodiments.

Referring now to the drawings, FIG. 1A illustrates an aircraft 100, in accordance with various embodiments. The aircraft 100 is an example of a passenger or transport vehicle in which noise attenuation systems may be implemented in accordance with various embodiments. In various embodiments, the aircraft 100 has a starboard wing 102 and a port wing 104 attached to a fuselage 106. The aircraft 100 also includes a starboard engine system 108 connected to the starboard wing 102 and a port engine system 110 connected to the port wing 104. In various embodiments, the aircraft 100 also includes a starboard horizontal stabilizer 112, a port horizontal stabilizer 114 and a vertical stabilizer 116. A pylon 118 is used to connect a gas turbine engine within the starboard engine system 108 to the starboard wing 102 and a gas turbine engine within the port engine system 110 to the port wing 104, though, in various embodiments, the gas turbine engines may be connected to other portions of the aircraft 100, such as, for example, to the port and starboard sides of the fuselage 106.

Figure 1B:
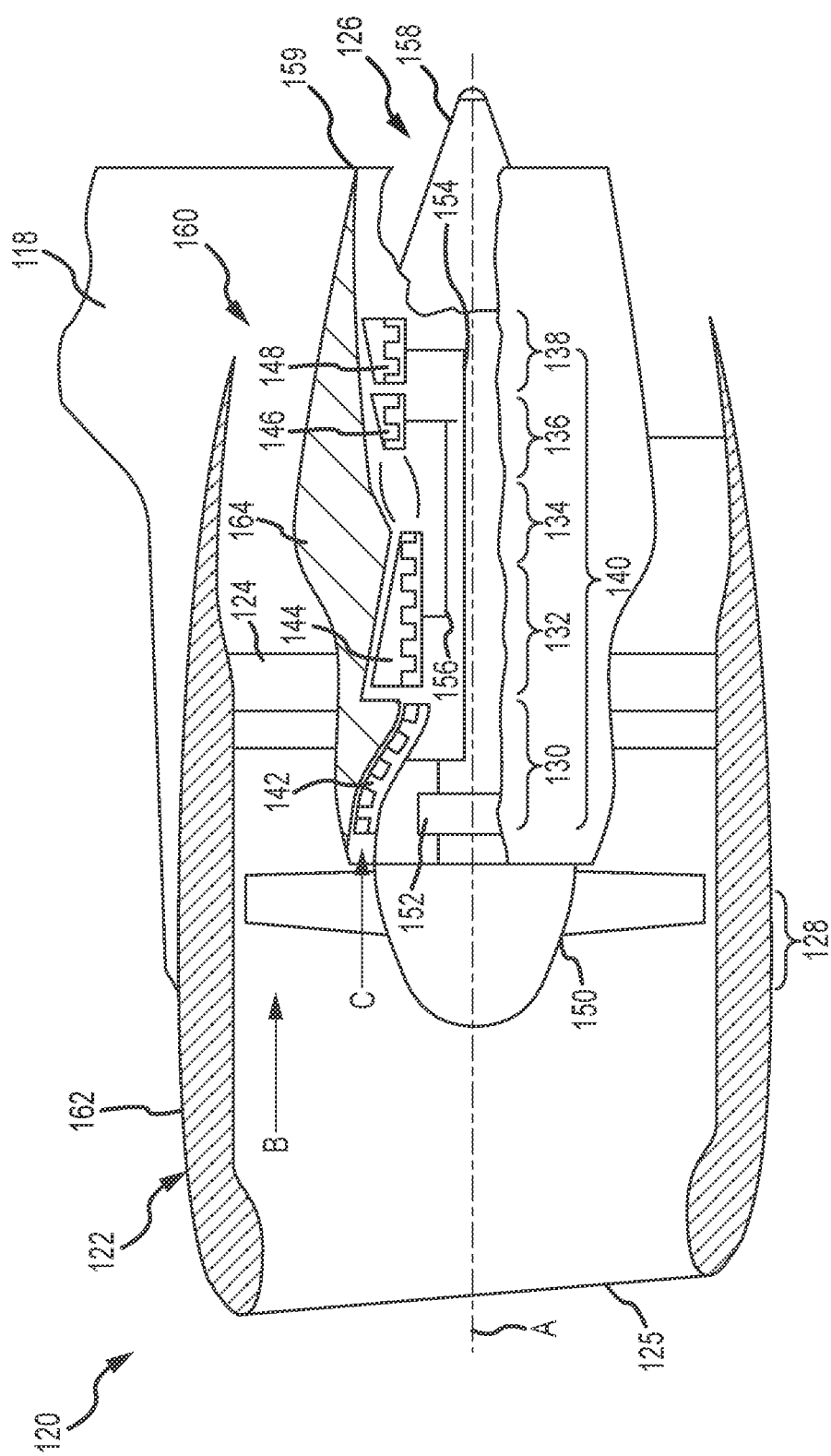
FIG. 1B is a side cutaway illustration of a propulsion system for the aircraft illustrated in FIG. 1A, in accordance with various embodiments.

Referring now to FIG. 1B, a side cutaway illustration of a gas turbine engine system 120, such as, for example, either of the starboard engine system 108 or the port engine system 110, is provided. The gas turbine engine system 120 includes the pylon 118 and a gas turbine engine 122 (e.g., a propulsion system) such as, for example, a geared turbofan engine that uses an outlet guide vane 124 (OGV) (or a plurality of outlet guide vanes) to structurally connect a fan module to a core engine module as well as redirect the incoming fan flow to the OGV. The gas turbine engine 122 is mounted to the pylon 118, which may be mounted to or otherwise configured with an aircraft airframe. Examples of an aircraft airframe include, but are not limited to, an aircraft wing (e.g., the starboard wing 102 or the port wing 104) or an aircraft fuselage (e.g., the fuselage 106).

The gas turbine engine 122 extends along an axial centerline A between an airflow inlet 125 and a core exhaust system 126. The gas turbine engine 122 includes a fan section 128, a low pressure compressor section 130 (LPC), a high pressure compressor section 132 (HPC), a combustor section 134, a high pressure turbine section 136 (HPT) and a low pressure turbine section (LPT) 138. The engine sections are typically arranged sequentially along the axial centerline A. The low pressure compressor section 130 (LPC), the high pressure compressor section 132 (HPC), the combustor section 134, the high pressure turbine section 136

(HPT) and the low pressure turbine section 138 (LPT) form a core 140 (or an engine core) of the gas turbine engine 122.

Each of the low pressure compressor section 130 (LPC), the high pressure compressor section 132 (HPC), the high pressure turbine section 136 (HPT) and the low pressure turbine section 138 (LPT) typically include a rotor having a plurality of rotor blades arranged circumferentially around and connected to one or more respective rotor disks—e.g., a low pressure compressor rotor 142, a high pressure compressor rotor 144, a high pressure turbine rotor 146 and a low pressure turbine rotor 148. A fan rotor 150 is connected to a gear train 152. The gear train 152 and the low pressure compressor rotor 142 are connected to and driven by the low pressure turbine rotor 148 through a low speed shaft 154 (or a low speed spool). The high pressure compressor rotor 144 is connected to and driven by the high pressure turbine rotor 146 through a high speed shaft 156 (or a high speed spool).

Air enters the gas turbine engine 122 (e.g., the propulsion system) through the airflow inlet 125, and is directed through the fan section 128 and into a core gas flow path C and a bypass gas flow path B. The air within the core gas flow path C may be referred to as "core air." The air within the bypass gas flow path B may be referred to as "bypass air." The core air is directed through the low pressure compressor section 130, the high pressure compressor section 132, the combustor section 134, the high pressure turbine section 136 and the low pressure turbine section 138 and exits the gas turbine engine 122 through the core exhaust system 126, which includes an exhaust centerbody 158 surrounded by an exhaust nozzle 159. Within the combustor section 134, fuel is injected into and mixed with the core air and ignited to provide a hot airstream that drives the turbine sections. The bypass air is directed through the bypass gas flow path B, and out of the gas turbine engine 122 through a bypass exhaust nozzle 160 to provide forward engine thrust. The bypass air may also or alternatively be directed through a thrust reverser to provide reverse engine thrust. A fan nacelle 162 is typically employed to surround the various sections of the gas turbine engine 122 and a core nacelle 164 is typically employed to surround the various sections of the core 140.

Figure 2:
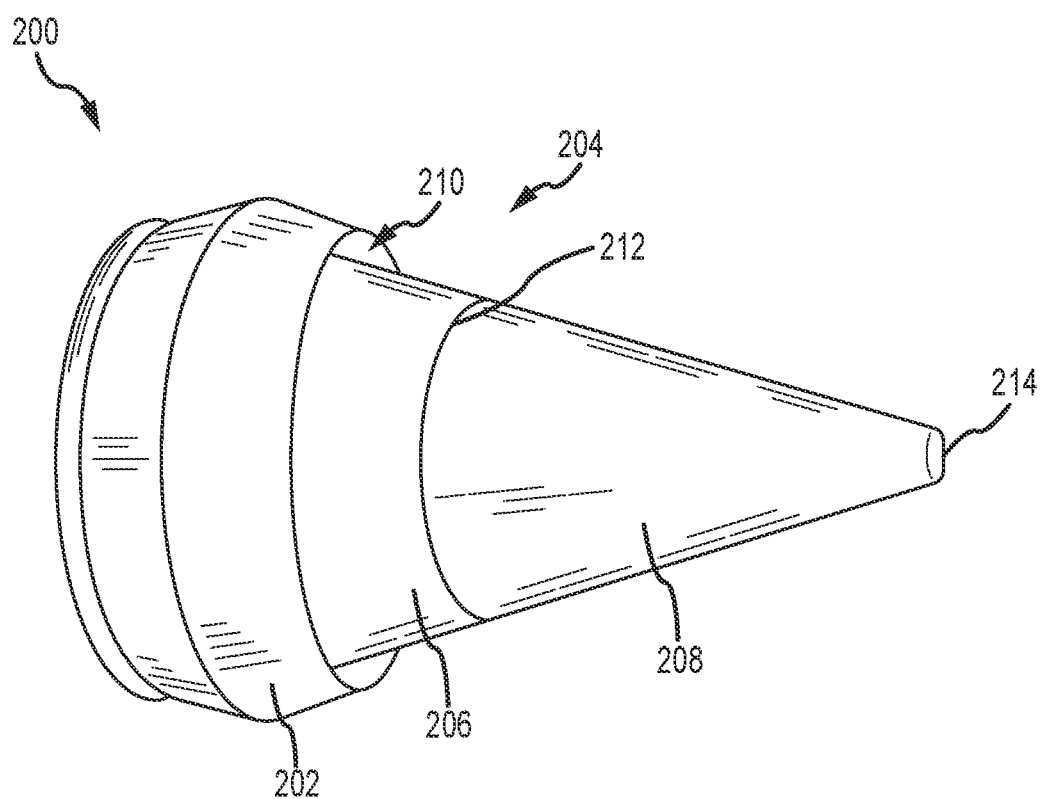
FIG. 2 is a perspective view of an exhaust portion of a gas turbine engine including an acoustically treated center plug, in accordance with various embodiments.

Referring now to FIG. 2, a schematic illustration of a core exhaust system 200, such as, for example, the core exhaust system 126 described above, is provided. In various embodiments, the core exhaust system 200 includes an exhaust nozzle 202 and a centerbody 204, similar to the exhaust nozzle 159 and the exhaust centerbody 158 described above. The centerbody 204 may be formed in two sections, including, for example, a center plug 206 and an aft cone 208. The exhaust nozzle 202 and the center plug 206 cooperate to form an annulus 210 through which exhaust gasses from a combustor section exit the core exhaust system 200. In various embodiments, the center plug 206 and the aft cone 208 are connected along a circumferential seam 212 at an aft end of the center plug 206. In various embodiments, the aft portion of the center plug 206 and the aft cone 208 extend aft from an aft end of the exhaust nozzle 202. The radially outer surfaces of the center plug 206 and the aft cone 208 combine to form a flow control surface that substantially prevents recirculation of the exiting exhaust gasses and facilitates convergence of the exhaust gasses as they exit the annulus 210. The center plug 206 forms a transition between an aft end of a turbine rotor located just inside the core exhaust system 200 and the aft cone 208. In various embodiments, the center plug 206 and the aft cone 208 may have hollow center portions that permit cooling air to pass from an intake 214 at an aft tip of the aft cone 208 to internal portions of the engine or to house instrumentation, wiring, or the like.

Figure 3A:
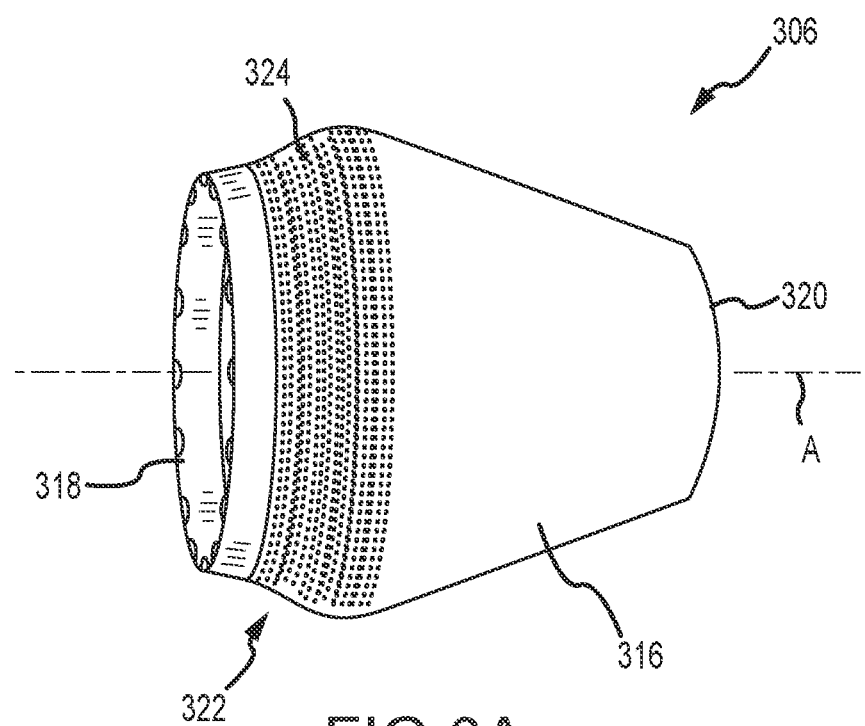
FIG. 3A is a perspective view of a center plug, in accordance with various embodiments.
Figure 3B:
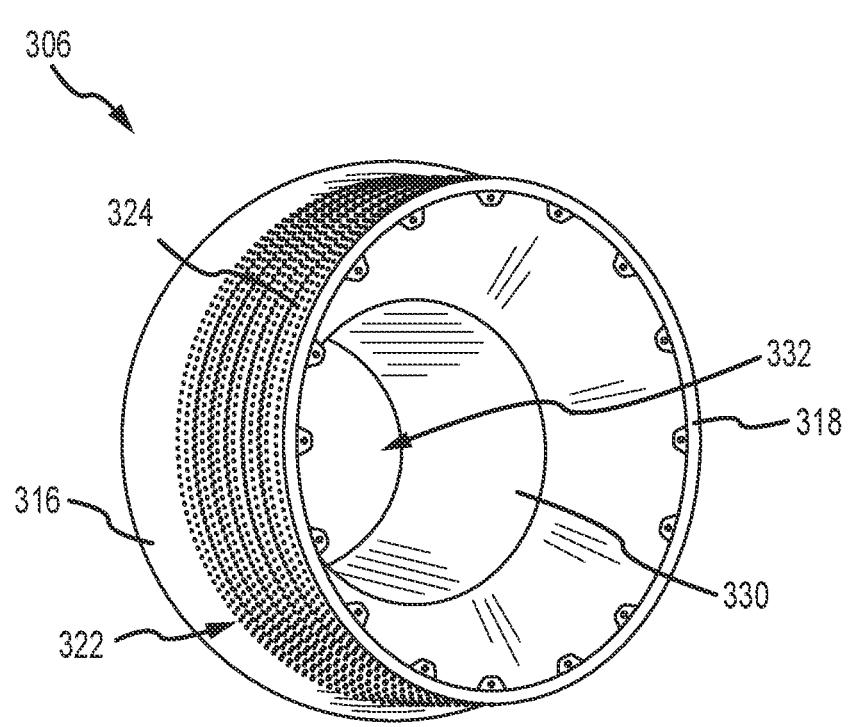
FIG. 3B is a perspective view of the center plug of FIG. 3A showing the forward end of the center plug, in accordance with various embodiments.
Figure 3C:
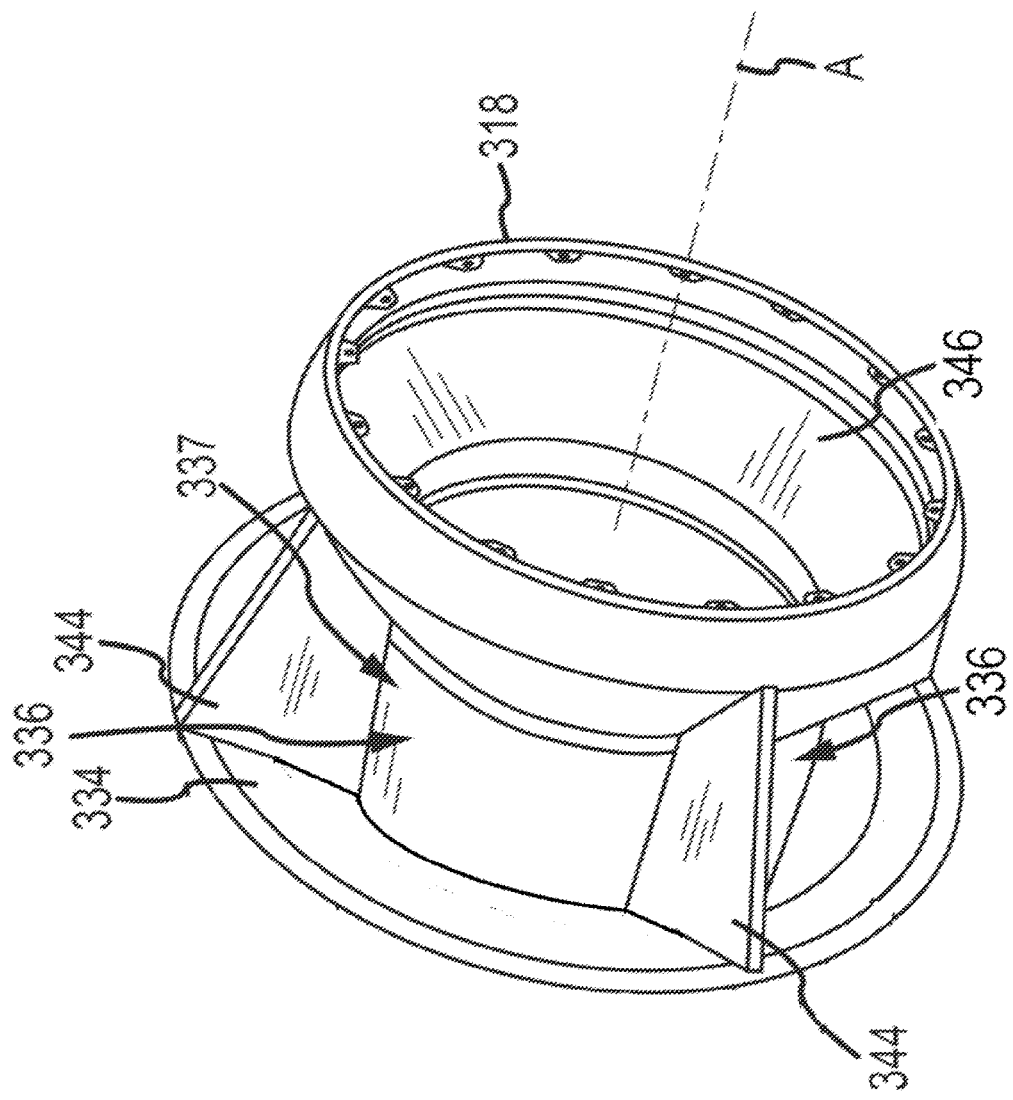
FIG. 3C is a perspective view of the center plug of FIGS. 3A and 3B with the outer skin removed, in accordance with various embodiments.

Referring now to FIGS. 3A, 3B, and 3C, schematic illustrations of a center plug 306, similar to the center plug 206 described above, are provided. In various embodiments, the center plug 306 includes an outer skin 316 having an aerodynamic outer contour. The outer skin 316 is seamlessly constructed such that the center plug 306 has a substantially smooth outer surface. The center plug 306 may have a forward flange 318 configured for attachment to a casing proximate an aft end of a turbine rotor and an aft flange 320 configured for attachment to an aft cone, such as, for example, the aft cone 208 described above. As illustrated, the outer skin 316 may include an acoustically permeable portion 322 located on a forward portion of the outer skin 316 and extending around substantially the entire circumference of the forward portion of the outer skin 316. In various embodiments, the acoustically permeable portion 322 is formed via a plurality of perforations 324 which extends through the outer skin 316 and into an interior portion of the center plug 306 that is bounded by the outer skin 316 and an inner skin 330, the latter of which has a substantially cylindrical shape, is centered along a central longitudinal axis A of the center plug 306 and forms a substantially open center portion 332 of the center plug 306.

The inner skin 330 may be constructed in segments or in a single, monolithic piece. The inner skin 330 has a substantially cylindrical shape and is centered along a central longitudinal axis A of the center plug 306. A forward bulkhead 346 extends between the inner skin 330 and the outer skin 316 proximate the forward flange 318. In various embodiments, the forward bulkhead 346 is non-perpendicular to the central longitudinal axis A and may be formed so an inner portion of the forward bulkhead 346 is positioned aft of an outer portion, which may be described as canted inwardly.

Referring primarily now to FIG. 3C, and with continued reference to FIGS. 3A and 3B, the center plug 306 is illustrated with the outer skin 316 removed. As shown in FIG. 3C, an aft bulkhead 334 extends between the inner skin 330 and the outer skin 316 proximate the aft flange 320. In various embodiments, the aft bulkhead 334 is non-perpendicular to the central longitudinal axis A and may be formed so an inner portion of the aft bulkhead 332 is positioned aft of an outer portion. The region bounded by the outer skin 316, the inner skin 330, the forward bulkhead 346 and the aft bulkhead 334 may define an annular chamber 336. A plurality of baffles 344 is spaced circumferentially about the inner skin 330 and extend radially between the inner skin 330 and the outer skin 316 and axially between the forward bulkhead 346 and the aft bulkhead 334. As illustrated, the plurality of baffles 344 may comprise two or more baffles spaced at ninety-degree (90°) intervals, thereby dividing the annular chamber 336 into four equally sized resonator cavities 337, each having substantially equal volumes and dimensions. The plurality of baffles 344 act to at least partially prevent sound waves that enter the resonator cavities from propagating in a circumferential direction between adjacent resonator cavities, and helps to restrict the sound waves to lower order modes of oscillation and propagation, such as plane wave modes.

Referring now to FIGS. 4A-4D, cross sectional schematic illustrations of a core exhaust system 400, such as, for example, the core exhaust system 200 described above, are provided. In various embodiments, the core exhaust system 400 includes an exhaust nozzle 402 and a centerbody 404, similar to the exhaust nozzle 202 and the centerbody 204 described above. The centerbody 404 may be formed in two sections, including, for example, a center plug 406 and an aft cone 408, similar to those described above. The exhaust nozzle 402 and the center plug 406 cooperate to form an annulus 410 through which exhaust gasses from a combustor section exit the core exhaust system 400. Similar to the description provided above with reference to FIGS. 3A-3C, the center plug 406 includes an outer skin 416 having an aerodynamic outer contour. The center plug 406 may have a forward flange 418 configured for attachment to a casing proximate an aft end of a turbine rotor and an aft flange 420 configured for attachment to the aft cone 408. As illustrated, the outer skin 416 may include an acoustically permeable portion 422. The acoustically permeable portion 422 may be formed by a plurality of openings 424 that extend through the outer skin 416. In various embodiments, the acoustically permeable portion 422 is located on a forward portion of the outer skin 416 and extends around substantially the entire circumference of the forward portion of the outer skin 416. As illustrated, the acoustically permeable portion 422 may coincide with one or more resonator cavities 437 (see, e.g., the four equally sized resonator cavities 337 in FIG. 3C).

The center plug 406 includes a substantially open center 426 bounded by an inner skin 428. The inner skin 428 has a substantially cylindrical shape and is centered along a central longitudinal axis A of the center plug 406. A forward bulkhead 430 extends between the inner skin 428 and the outer skin 416 proximate the forward flange 418. An aft bulkhead 432 extends between the inner skin 428 and the outer skin 416 proximate the aft flange 420. The region bounded by the outer skin 416, the inner skin 428, the forward bulkhead 430 and the aft bulkhead 432 define an annular chamber 436. Other details of the center plug 406 are similar to those described above with reference to FIGS. 3A-3C and so are not repeated here.

Still referring to FIGS. 4A-4D, the core exhaust system 400 includes a series of noise attenuation zones having noise attenuation structures configured to attenuate noise in both low frequency ranges and high frequency ranges—e.g., in a range between about 200 Hz and about 800 Hz (e.g., combustion noise) for the annular chamber 436 and 1500 Hz or higher (e.g., turbine noise) for the noise attenuation panels (e.g., acoustic liners), as described herein. In various embodiments, for example, a first noise attenuation zone 450 is located on a radial inner side of the exhaust nozzle 402. A first noise attenuation panel 452 is positioned within the first noise attenuation zone 450. A perforated skin 454 is located on a radial inner side of the first noise attenuation panel 452 and configured for acoustic waves from the engine exhaust to communicate with the first noise attenuation panel 452. In various embodiments, the first noise attenuation panel 452 is tuned to attenuate noise within a frequency range of about 1000 Hz-1500 Hz and higher. The first noise attenuation panel 452 may comprise a single panel that extends circumferentially about the exhaust nozzle 402 or may comprise a segmented system of noise attenuation panels configured to extend circumferentially about the exhaust nozzle 402.

Figure 4A:
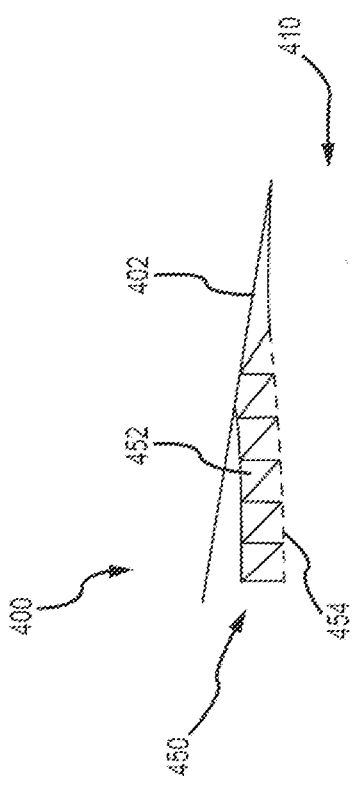
FIG. 4A is a cross sectional schematic view of a core exhaust system, in accordance with various embodiments.
Figure 4B:
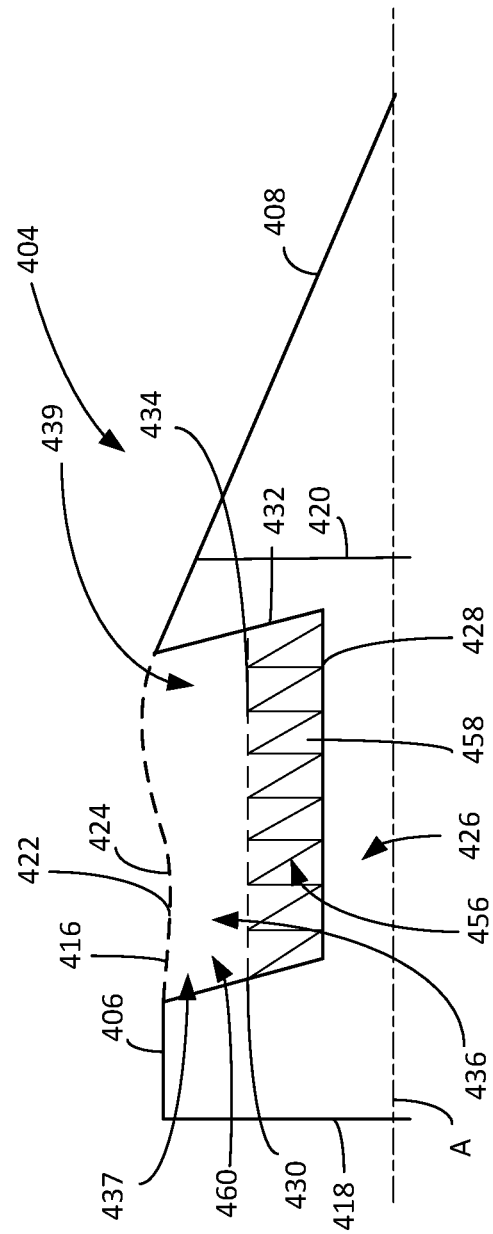
FIG. 4B is a cross sectional schematic view of a core exhaust system, in accordance with various embodiments.
Figure 4C:
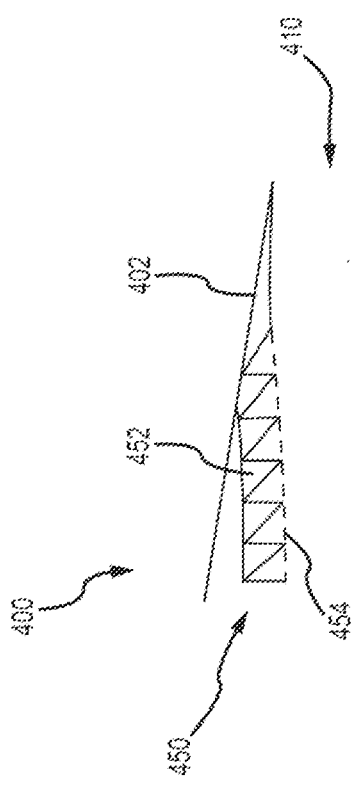
FIG. 4C is a cross sectional schematic view of a core exhaust system, in accordance with various embodiments.
Figure 4D:
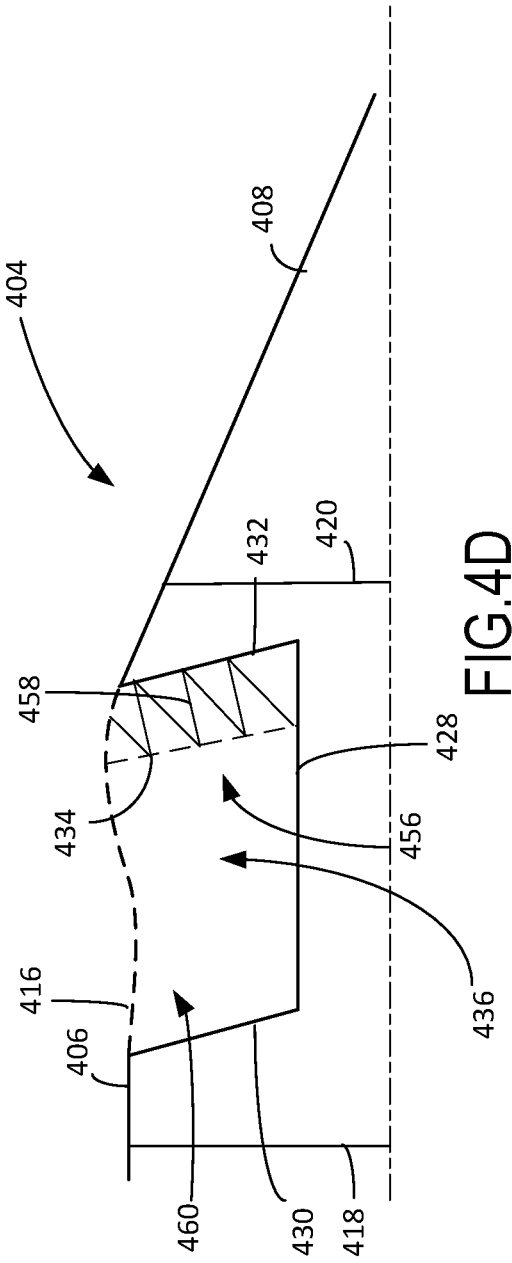
FIG. 4D is a cross sectional schematic view of a core exhaust system, in accordance with various embodiments.

A second noise attenuation zone 456 is located within the annular chamber 436 of the center plug 406. A second noise attenuation panel 458 is positioned within the second noise attenuation zone 456. The second noise attenuation panel 458 may extend between the forward bulkhead 430 and the aft bulkhead 432 (as illustrated in FIG. 4B). In various embodiments, the second noise attenuation panel 458 may extend between the outer skin 416 and the inner skin 428 along the aft bulkhead 432 (as illustrated in FIG. 4D). In various embodiments, the second noise attenuation panel 458 may extend between the outer skin 416 and the inner skin 428 along the forward bulkhead 430, or alternatively the second noise attenuation panel 458 may be disposed along all three interior surfaces.

The second noise attenuation panel 458 may include an outer layer 434. The outer layer 434 may be a perforated sheet of the second noise attenuation panel 456 embedded inside the annular chamber 436. The outer layer 434 may extend between the forward bulkhead 430 and the aft bulkhead 432 (as illustrated in FIG. 4B), integral with the second noise attenuation panel 458. Similarly, in various embodiments, the outer layer 434 may extend between the outer skin 416 and the inner skin 428 (as illustrated in FIG. 4D), integral with the second noise attenuation panel 458.

The acoustically permeable portion 422 of the outer skin 416 is located on a radial outer side of the second noise attenuation panel 458 and configured for acoustic waves from the engine exhaust to communicate with the second noise attenuation panel 458. The second noise attenuation zone 456 may comprise a single annular zone that extends circumferentially about the center plug 406 with the second noise attenuation panel 458 extending the full circumference about the center plug 406. Or, in various embodiments, the second noise attenuation zone 456 may comprise a plurality of segments that extend circumferentially about the center plug 406. In the latter case, for example, a plurality of baffles, such as the plurality of baffles 344, may be configured to divide the second noise attenuation zone 456 into the segmented structure, with the second noise attenuation panel 458 being segmented for positioning into each zone of the segmented noise attenuation zone. In various embodiments, the second noise attenuation panel 458 is tuned to attenuate noise higher than 1500 Hz.

A third noise attenuation zone 460 is located both forward and radially inside of the second noise attenuation zone 456. In various embodiments, for example, the third noise attenuation zone 460 comprises the space between the forward bulkhead 430 and the aft bulkhead 432 that is not occupied by the second noise attenuation zone 456. Stated alternatively, the third noise attenuation zone comprises the space defined by the annular chamber 436 that is not occupied by the second noise attenuation panel 458. As described, the third noise attenuation zone 460 defines a chamber for noise to propagate and is sized to attenuate noise within a range of about 200 Hz to about 800 Hz. For example, acoustic waves from the engine exhaust enter the third noise attenuation zone 460 via the acoustically permeable portion 422 of the outer skin 416 and are reflected off the various bulkheads that define the third noise attenuation zone 460. The third noise attenuation zone 460, configured as described and illustrated in FIG. 4B, functions as a single degree of freedom (SDOF) resonator configured to attenuate acoustic noise exhibiting relatively long wavelengths and low frequencies.

Figure 3E:
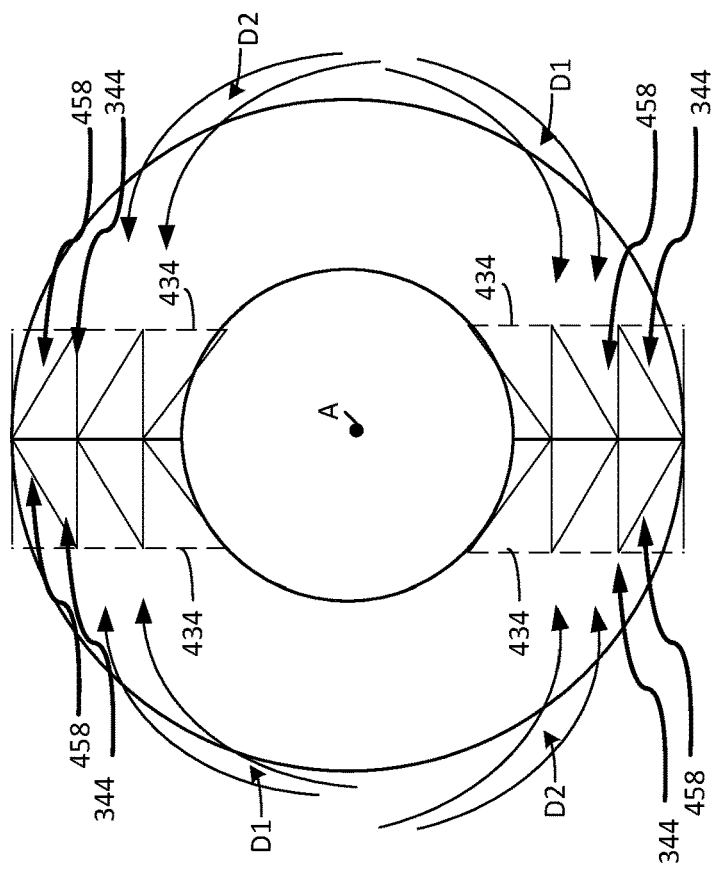
FIG. 3E is a front view of the interior portions of the center plug shown in FIG. 3C, in accordance with various embodiments.
Figure 3D:
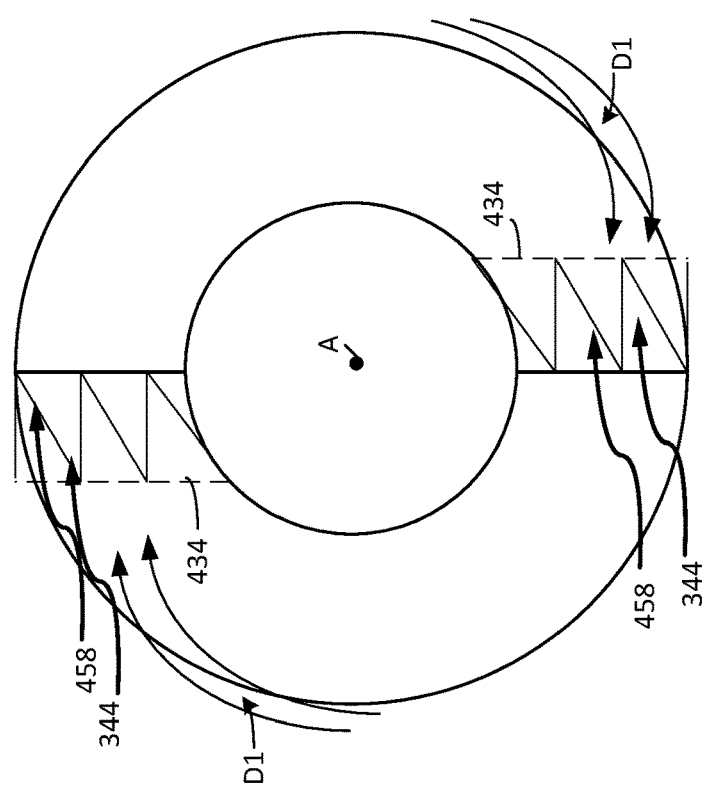
FIG. 3D is a front view of the interior portions of the center plug shown in FIG. 3C, in accordance with various embodiments.

Referring briefly to FIGS. 3D and 3E and the center plug 306, in various embodiments, noise attenuation panels (e.g., the second noise attenuation panel 458) may be disposed on the plurality of baffles 344 the center plug 306. The second noise attenuation panels 458 may be positioned such that the noise is received in a rotating pattern. For instance, the sound waves propagate in a circumferential direction about the axial centerline A. In other words, the perforated skin 434 will be in confronting relation with the rotation pattern on the acoustic wave according to the propagation of the wave in a first direction D1. In various embodiments, the acoustic wave may rotate in a second direction D2, opposite the first direction D1. Accordingly, in various embodiments (see e.g., FIG. 3E) the plurality of baffles 344 may be disposed as pairs such that the plurality of baffles 344 may be positioned in confronting relation with the rotation pattern on the acoustic wave in both the first direction and the rotation pattern on the acoustic wave in the second direction D2. For instance, the pair of the plurality of baffles 344 are positioned in opposite directions of each other about a radial axis perpendicular to the axial centerline A such that the perforated skin 434 of each of the second noise attenuation panels 458 on the baffles 344 is facing an opposite outer direction. In other words, the pair of the plurality of baffles 344 may be a single acoustically treated baffle, using a sandwich panel comprising a perforated screen, a core structure with a serrated shape, and a solid back skin. In various embodiments, the plurality of baffles 344 may be disposed as single baffles similar to the configuration as illustrated in FIG. 3D, but in positioned only to receive the rotation pattern on the acoustic wave in the second direction D2 (e.g., the plurality of baffles 344 are flipped about the radial axis).

Figure 5:
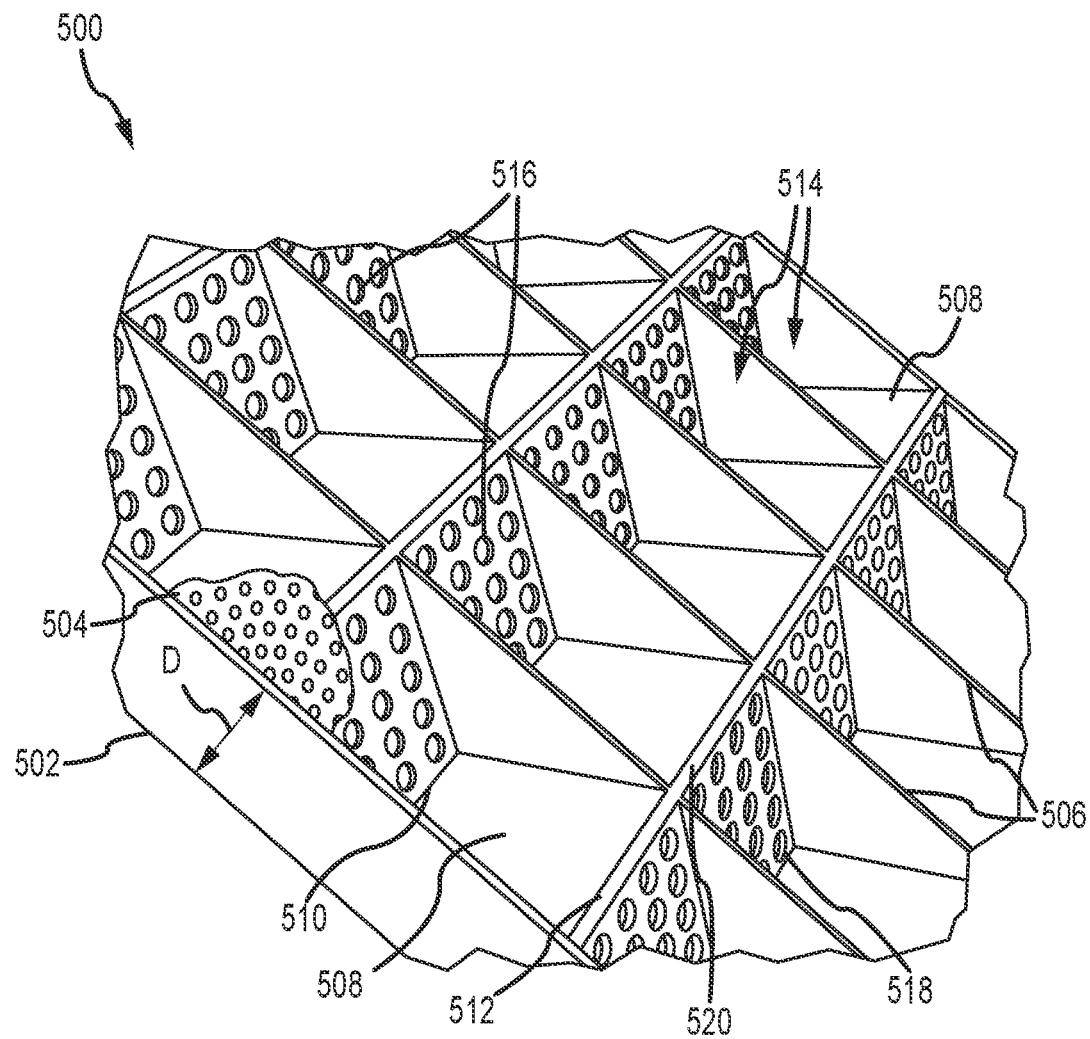
FIG. 5 is a perspective schematic view of an acoustic noise attenuation panel, in accordance with various embodiments.
Figure 6A:
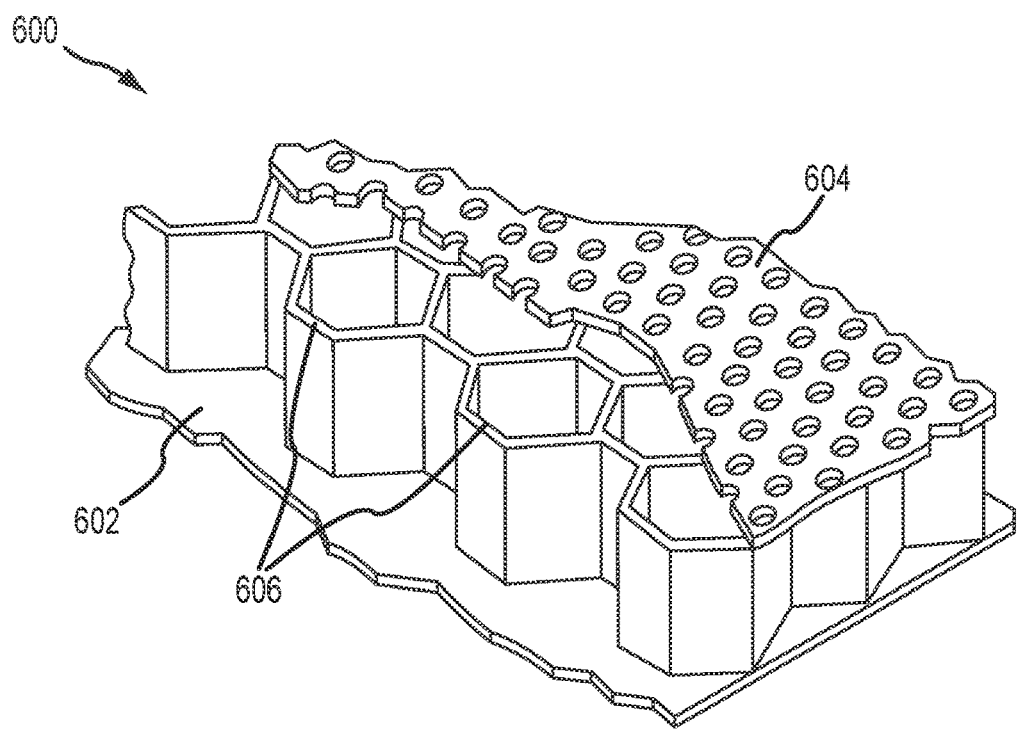
FIGS. 6A and 6B are perspective schematic views of acoustic noise attenuation panels, in accordance with various embodiments.
Figure 6B:
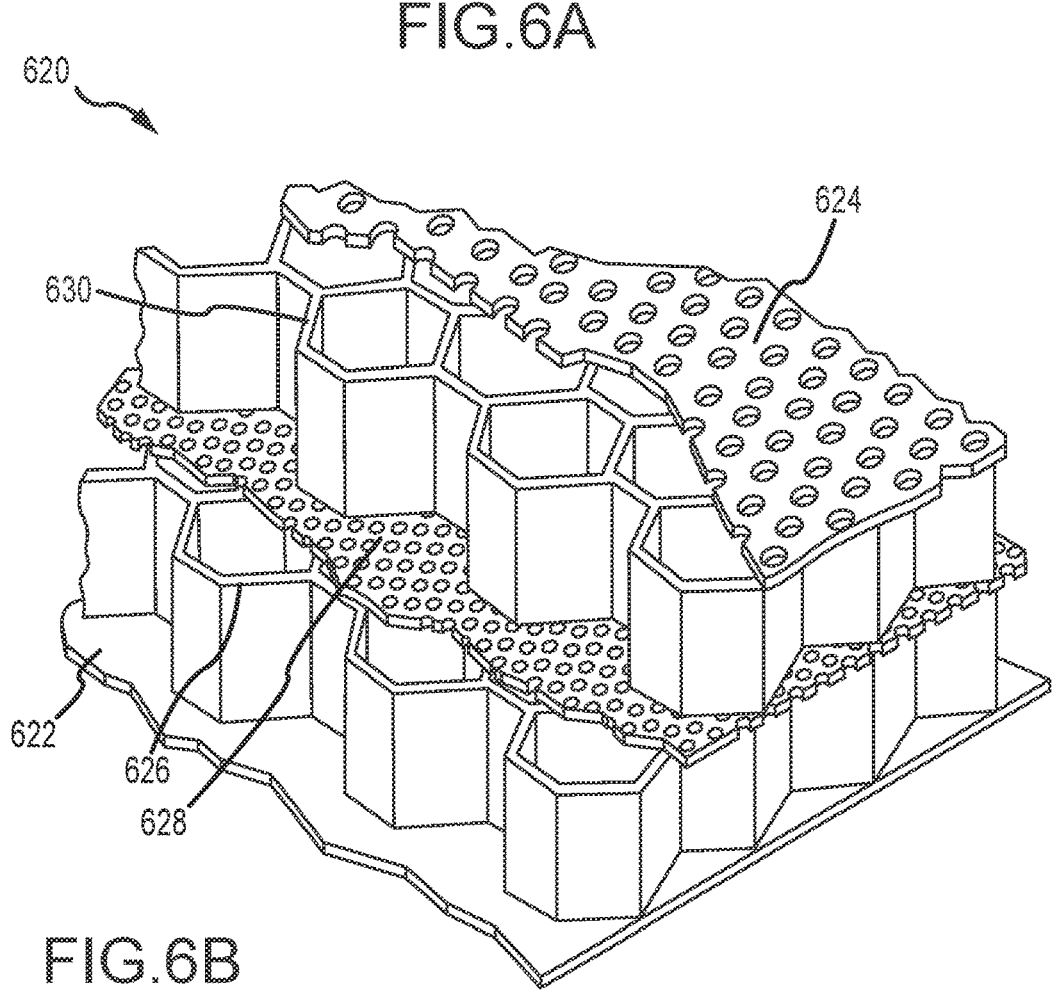

Referring now to FIG. 5 and to FIGS. 6A and 6B, various embodiments of noise attenuation panels, suitable for use as the first noise attenuation panel 452 and the second noise attenuation panel 458, are illustrated. In a first embodiment, illustrated in FIG. 5, a noise attenuation panel 500 (sometimes referred to as an N-core attenuation panel) includes a non-permeable back panel 502 (hidden) and a permeable face sheet 504 that is parallel to (or coaxial with) and spaced from the non-permeable back panel 502 by a distance D. A plurality of sidewalls 506 extend laterally between and engage with the non-permeable back panel 502 and the permeable face sheet 504. The sidewalls among the plurality of sidewalls 506 are spaced from one-another, are substantially parallel to one-another, and are substantially normal to the non-permeable back panel 502 and the permeable face sheet 504. A plurality of non-permeable walls 508 extend longitudinally through the plurality of sidewalls 506, each having a first edge 510 and a second edge 512, with the first edge 510 being engaged to the non-permeable back panel 502 and the second edge 512 being engaged to the permeable face sheet 504. A plurality of cells 514 of the noise attenuation panel 500 are defined by and between the non-permeable back panel 502 and the permeable face sheet 504, the plurality of sidewalls 506 and the plurality of non-permeable walls 508. A plurality of permeable walls 516 extend longitudinally through the plurality of sidewalls 506, each having a first edge 518 and a second edge 520, with the first edge 518 being engaged to the non-permeable back panel 502 and the second edge 520 being engaged to the permeable face sheet 504. A permeable segment 522 of each of the plurality of permeable walls 516 is in each one of the plurality of cells 514. The plurality of non-permeable walls 508 and the plurality of permeable walls 516 may be one continuous fold panel, folded along the respective first edges (510, 518) and again at the respective second edges (512, 520).

Referring to FIGS. 6A and 6B, second and third embodiments, suitable for use as the first noise attenuation panel 452 and the second noise attenuation panel 458, are illustrated. In general, these panels are Helmholtz resonators of the single degree of freedom (SDOF) or the double degree of freedom (DDOF) type. Referring to FIG. 6A, for example, a SDOF panel 600 is illustrated. The SDOF panel 600 includes a non-permeable back panel 602 and a permeable face sheet 604. A cellular core 606 is sandwiched between the non-permeable back panel 602 and the permeable face sheet 604. Referring to FIG. 6B, a DDOF panel 620 is illustrated. The DDOF panel 620 includes a non-permeable back panel 622 and a permeable face sheet 624. A first cellular core 626 is sandwiched between the non-permeable back panel 602 and a permeable center sheet 628 and a second cellular core 630 is sandwiched between the permeable face sheet 604 and the permeable center sheet 628.

As with the N-core attenuation panel described above, the acoustic properties of the SDOF panel 600 and the DDOF panel 620 may be tailored to specific applications by, among other things, changing the size or the density of the cores. As mentioned previously, for example, relatively thin acoustic panels may be utilized to attenuate noise with relatively short wavelengths and high frequencies, whereas relatively thick acoustic panels may be utilized to attenuate noise with relatively long wavelengths and low frequencies. Thus, the size of the noise attenuation panels described with reference to FIGS. 4B and 4D are illustrated as having progressively larger cores (e.g., the second noise attenuation panel 458 has a larger core than the first noise attenuation panel 452) to attenuate noise exhibiting progressively longer wavelengths and lower frequencies. For example, the third noise attenuation zone 460 exhibits larger characteristic dimensions than both the first noise attenuation zone 450 and the second noise attenuation zone 456 as it is configured to attenuate noise having the longest wavelengths and the lowest frequencies of the noise attenuation system. Similarly, the first noise attenuation zone 450 exhibits smaller characteristic dimensions than both the second noise attenuation zone 456 and the third noise attenuation zone 460 as it is configured to attenuate noise having the shortest wavelengths and the highest frequencies of the noise attenuation system. As presented and described, the present disclosure provides a manner of attenuating low and high frequency noise, typically in a range between about 200 Hz and about 800 Hz, and 1500 Hz or higher, as generated by a combustor or a core engine exhaust system, or a turbine, respectively.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A center plug for attenuating noise in a gas turbine engine, comprising:
    an inner skin, the inner skin having a substantially cylindrical shape and extending along an axial centerline;
    a forward bulkhead disposed proximate a forward end of the inner skin, the forward bulkhead connected to and extending radially outward from the inner skin;
    an aft bulkhead disposed proximate an aft end of the inner skin, the aft bulkhead connected to and extending radially outward from the inner skin;
    an outer skin, the outer skin connected to and positioned radially outward of the forward bulkhead and the aft bulkhead;
    a plurality of baffles spaced circumferentially about the inner skin and extend radially between the inner skin and the outer skin and axially between the forward bulkhead and the aft bulkhead; and
    a noise attenuation panel disposed on a first side of each baffle of the plurality of baffles, the noise attenuation panel positioned such that noise is received in a rotating pattern in a first direction.

2. The center plug of claim 1, wherein the outer skin, the inner skin, the forward bulkhead and the aft bulkhead define an annular chamber.

3. The center plug of claim 2, wherein the noise attenuation panel extends between the outer skin and the inner skin.

4. The center plug of claim 2, wherein the outer skin includes an acoustically permeable portion in fluid communication with the annular chamber.

5. The center plug of claim 1, wherein the noise attenuation panel is configured to attenuate noise at a frequency of at least 1500 Hz.

6. The center plug of claim 1, wherein the noise attenuation panel is a first noise attenuation panel, the noise is first noise, and the rotating pattern is a first rotating pattern, and further comprising:
    a second noise attenuation panel disposed on a second side of each baffle of the plurality of baffles, the second noise attenuation panel positioned such that second noise is received in a second rotating pattern in a second direction, wherein the second direction is opposite the first direction.

7. A noise attenuation system for a gas turbine engine, comprising:
    an exhaust nozzle having a first noise attenuation panel disposed on a radial inner side of the exhaust nozzle;
    a center plug, the exhaust nozzle configured to surround the center plug, the center plug comprising:
        an inner skin, the inner skin having a substantially cylindrical shape and extending along an axial centerline,
        a forward bulkhead disposed proximate a forward end of the inner skin, the forward bulkhead connected to and extending radially outward from the inner skin,
        an aft bulkhead disposed proximate an aft end of the inner skin, the aft bulkhead connected to and extending radially outward from the inner skin,
        an outer skin, the outer skin connected to and positioned radially outward of the forward bulkhead and the aft bulkhead,
        a plurality of baffles spaced circumferentially about the inner skin and extend radially between the inner skin and the outer skin and axially between the forward bulkhead and the aft bulkhead, and
        a second noise attenuation panel disposed on a first side of each baffle of the plurality of baffles, the second noise attenuation panel positioned such that the noise is received in a rotating pattern in a first direction.

8. The noise attenuation system of claim 7, wherein the outer skin, the inner skin, the forward bulkhead, and the aft bulkhead define an annular chamber.

9. The noise attenuation system of claim 7, wherein the second noise attenuation panel extends between an outer skin and the inner skin.

10. The noise attenuation system of claim 7, wherein the first noise attenuation panel comprises a single panel configured to extend circumferentially about the exhaust nozzle.

11. The noise attenuation system of claim 8, further comprising a plurality of baffles spaced circumferentially about the inner skin and extending radially between the inner skin and the outer skin and axially between the forward bulkhead and the aft bulkhead.

12. The noise attenuation system of claim 11, wherein the plurality of baffles includes four baffles spaced at ninety-degree intervals such that the annular chamber is divided into four equally sized resonator cavities.

13. The noise attenuation system of claim 11, wherein the second noise attenuation panel is disposed on at least one of the plurality of baffles.

14. The noise attenuation system of claim 13, wherein the outer skin includes an acoustically permeable portion in fluid communication with the annular chamber.

15. The noise attenuation system of claim 14, wherein the acoustically permeable portion is formed by a plurality of openings extending through the outer skin such that the acoustically permeable portion coincides with the resonator cavities.

16. The noise attenuation system of claim 7, wherein the first noise attenuation panel and the second noise attenuation panel are configured to attenuate noise at a frequency of at least 1500 Hz.

17. The noise attenuation system of claim 7, further comprising an outer layer integral with the second noise attenuation panel, wherein the outer layer is a perforated sheet of the second noise attenuation panel.

18. The noise attenuation system of claim 7, wherein the noise is first noise and the rotating pattern is a first rotating pattern, and further comprising:
  a third noise attenuation panel disposed on a second side of each baffle of the plurality of baffles, the third noise attenuation panel positioned such that second noise is received in a second rotating pattern in a second direction, wherein the second direction is opposite the first direction.

* * * * *